(No Model.)
S. M. ALLEN.
PIPE AND CONDUIT FOR CONVEYING LIQUIDS, &c.
No. 284,794. Patented Sept. 11, 1883.
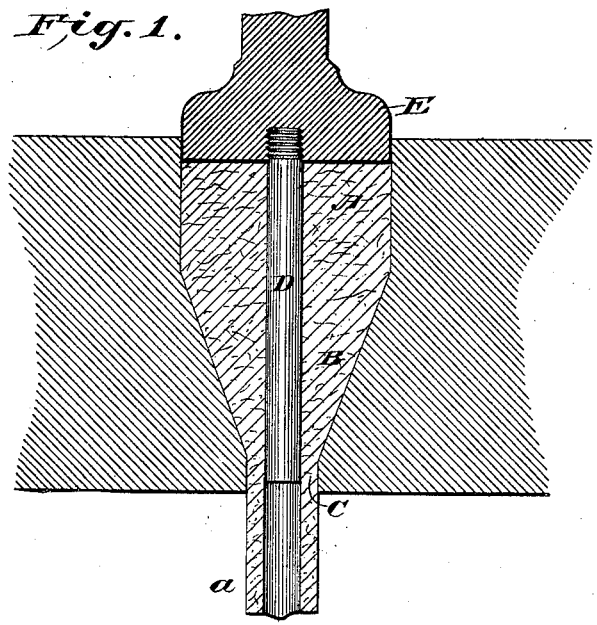
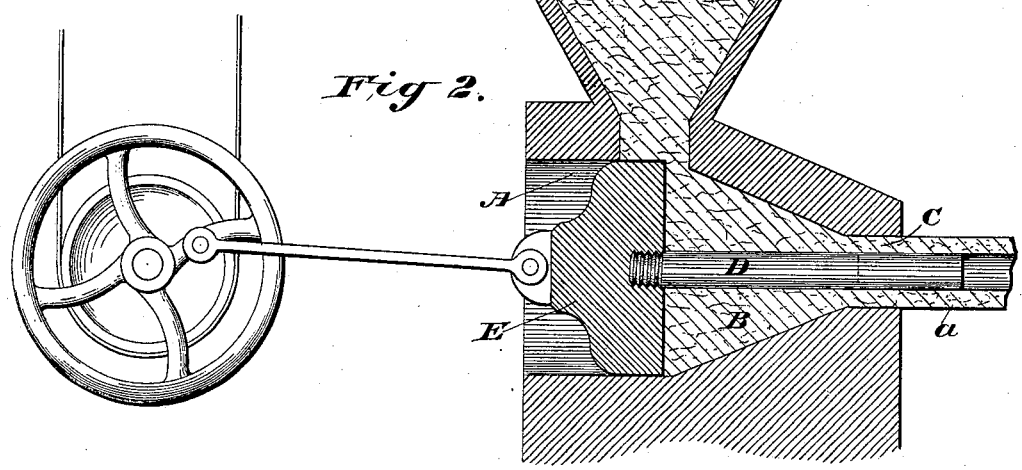
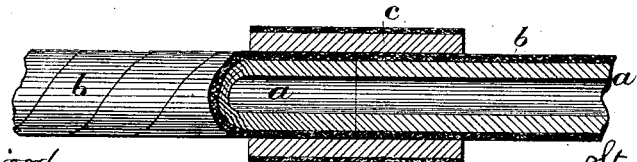
Attest:
Geo. T. Smallwood.
J. Henry Kaiser.
Inventor
Stephen M. Allen
by A. Pollok
his attorney

UNITED STATES PATENT OFFICE.

STEPHEN M. ALLEN, OF DUXBURY, MASSACHUSETTS.

PIPE AND CONDUIT FOR CONVEYING LIQUIDS, &c.

SPECIFICATION forming part of Letters Patent No. 284,794, dated September 11, 1883.

Application filed July 21, 1883. (No model.)

*To all whom it may concern:*

Be it known that I, STEPHEN M. ALLEN, of Duxbury, in the county of Plymouth and Commonwealth of Massachusetts, have invented a new and useful Improvement in Pipes or Conduits for Conveying Liquids and Gases, for Containing Electrical Conductors, and for other Purposes, which improvement is fully set forth in following specification.

This invention consists, first, in the manufacture of tubes, pipes, or conduits for conveying water or gas or other fluids, or for containing telegraph and telephone wires and other electrical conductors, or for other purposes, from a composition of asphalt or similar material and wood pulp or other fiber. A composition of this kind is described in Letters Patent No. 278,481, granted to me May 29, 1883, the said composition being mainly for roofing purposes. In the present invention it is preferred to use a somewhat larger proportion of fiber, although this is not essential. The material similar to asphalt may be any substance of a resinous or tarry nature, as fully set forth in said patent.

In order to manufacture the tubes, pipes, or conduits, the composition may be formed into shape in any ordinary or usual way of making pipes, tubes, or conduits. It may, for example, be cast in a mold around a removable core; or it may be formed into sheets and wrapped on a mandrel; or it may be pressed out from the plastic mass by means of a tile-machine or pipe-press of any ordinary or suitable construction. It is preferred, however, to press the pipes or tubes from a mass through a gradually-tapered conical die around a core, whereby it is greatly compressed and solidified. This first part of the invention includes also the lining or coating or lining and coating of pipes with the aforesaid composition. The operation may be performed in the manner and by the means heretofore devised or used for lining or coating or lining and coating pipes with plastic material.

The invention, secondly, consists in combining fabric (paper or woven fabric and the like) with the composition of asphalt and fiber, whereby the pipes, tubes, or conduits are strengthened. When a pipe-press is used, the strengthening fabric is wrapped around the tube at any convenient time after it has issued from the die.

In the accompanying drawings, Figures 1 and 2 are partial views of two forms of pipe-press, or machines for pressing out the lengths of pipe; and Fig. 3, a sectional view, showing the pipe with its applied strengthening fabric and means for joining the ends of two lengths of pipe.

Referring to Fig. 1, A is the receiving-chamber or cylinder of the press; B, the gradually-tapered conical part of the die; C, the cylindrical outlet of the die; D, the core, and E the plunger or piston.

To make the length of pipe, the resinous or tarry matter (say one hundred pounds of coal-tar asphaltum) is heated, and while in a liquid or pasty condition the fiber (say two hundred and fifty to three hundred pounds of dried wood pulp) is mixed thoroughly therewith. The pasty mass is then, while still hot, transferred to the receiving-chamber or cylinder A and die B C and placed around the core D. The plunger or piston E is then forced into the receiving-chamber or cylinder A, expelling the composition in the form of a pipe, tube, or conduit from the mouth of the die B C, and thoroughly compressing it. Suitable means are or may be used to heat the composition, so as to maintain it in a plastic state. The composition sets or hardens after it leaves the machine. Before it hardens, however, it is wrapped in a sheet, *b*, Fig. 3, of fabric saturated with asphalt or other resinous or tarry matter, *a* in said figure being the composition pipe, tube, or conduit. When the piston or plunger E reaches the cone B, it is withdrawn and the receiving-chamber or cylinder again filled up.

In Fig. 2 the cylinder or receiving-chamber A is horizontal, and has a hopper, F, feeding into the upper part thereof, and the plunger or piston E is reciprocated by means of a crank and connecting-rod. At each forward movement it forces the composition through the die B C around the core D, and at each backward movement the chamber or cylinder A in front of it is filled by material from the hopper.

In both figures the core is shown attached to and movable with the plunger or piston; but it may be fastened by suitable arms or ribs to the sides of the cylinder or receiving-chamber; or it may be extended through the plunger and fastened to any convenient part of the machine.

The pipe or tube may be made in or divided into sections of any desired length. The joint between the sections or lengths may be made by a collar, c, Fig. 3, formed of the same compound or of other suitable material, and the spaces filled with asphaltum or like substance; or other known or suitable means for making a joint between lengths of pipe may be adopted.

It is obvious that articles not tubular could be made from the composition of asphaltum or like material and fiber by pressing the same through a die by a plunger or piston.

If the pipe, tube, or conduit is to be made by wrapping sheets of the material around a mandrel, the composition may be applied to the strengthening fabric before wrapping. The strengthening fabric may be omitted when it is so desired. It is not necessary that the plastic material be wholly of resinous or tarry matters and fibers, since other materials—say powdered minerals on the one hand, or oils and like materials on the other—may be added. Animal as well as vegetable fiber may be used. The pipe may be in straight or in curved lengths, in the form of traps, Y or T branches, or, in fine, in any suitable form.

Having now fully described my said invention and the manner of carrying the same into effect, what I claim is—

1. A pipe, tube, or conduit for conveying liquid or gas, for containing electrical conductors, or for other purposes, made of or lined or coated with a composition of animal or vegetable fiber, mixed with a resinous or tarry material, substantially as described.

2. A pipe, tube, or conduit for conveying liquids or gases, for containing electrical conductors, or for other purpose, made of a composition of animal or vegetable fiber, mixed with resinous or tarry material and wrapped or combined with strengthening fabric, substantially as described.

3. The method of making pipes, tubes, or conduits by mixing animal or vegetable fiber—wood pulp, for example—with liquefied resinous or tarry material, and then making the composition into tubular forms, substantially as described.

4. A pipe, tube, or conduit for conveying liquids or gas, for containing electrical conductors, or for other purpose, formed of a compressed composition of asphalt or other resinous or tarry matters and animal or vegetable fiber, substantially as described.

5. The manufacture of pipes, tubes, conduits, or other articles by pressing a composition of asphalt or other resinous or tarry matters and wood or other fiber, animal or vegetable, through a contracted opening or die, substantially as described.

In testimony whereof I have signed this specification in the presence of two subscribing witnesses.

STEPHEN M. ALLEN.

Witnesses:
   FLORENCE L. EMERY,
   ANNIE G. FLAGG.